US012129326B2

(12) United States Patent
Kuhlman et al.

(10) Patent No.: US 12,129,326 B2
(45) Date of Patent: Oct. 29, 2024

(54) METHOD OF MAKING METAL-LIGAND COMPLEXES

(71) Applicant: Dow Global Technologies LLC, Midland, MI (US)

(72) Inventors: Roger L. Kuhlman, Freeport, TX (US); Pamela D. Nagel, Freeport, TX (US)

(73) Assignee: Dow Global Technologies LLC, Midland, MI (US)

( * ) Notice: Subject to any disclaimer, the term of this patent is extended or adjusted under 35 U.S.C. 154(b) by 587 days.

(21) Appl. No.: 17/600,409

(22) PCT Filed: Apr. 27, 2020

(86) PCT No.: PCT/US2020/030040
§ 371 (c)(1),
(2) Date: Sep. 30, 2021

(87) PCT Pub. No.: WO2020/223144
PCT Pub. Date: Nov. 5, 2020

(65) Prior Publication Data
US 2022/0220230 A1   Jul. 14, 2022

Related U.S. Application Data

(60) Provisional application No. 62/840,865, filed on Apr. 30, 2019.

(51) Int. Cl.
*C08F 4/76* (2006.01)
*C07F 17/00* (2006.01)
*C08F 4/6592* (2006.01)

(52) U.S. Cl.
CPC .......... *C08F 4/65925* (2013.01); *C07F 17/00* (2013.01); *C08F 4/76* (2013.01)

(58) Field of Classification Search
None
See application file for complete search history.

(56) References Cited

U.S. PATENT DOCUMENTS

| 5,225,500 | A | * | 7/1993 | Elder ..................... C07F 17/00 526/170 |
| 5,952,430 | A | | 9/1999 | Van Der Heijden et al. |
| 8,399,725 | B2 | | 3/2013 | Brant et al. |
| 2018/0186912 | A1 | | 7/2018 | Rix et al. |
| 2019/0263944 | A1 | | 8/2019 | Kuhlman et al. |

FOREIGN PATENT DOCUMENTS

| KR | 20180063669 A | * | 6/2018 |
| WO | 2018067289 | | 4/2018 |

OTHER PUBLICATIONS

Schmid, M. A. et al., "Unbridged cyclopentadienyl-fluorenyl complexes of zirconium as catalysts for homogeneous olefin polymerization". Journal of Organometallic Chemistry 1995, 501(1), 101-106. (Year: 1995).*
International Search Report & Written Opinion for related PCT Application PCT/US2020/030040, mailed Aug. 20, 2020 (12 pgs).
Schmid, et al., "Unbridged Cyclopentadienyl-Fluorenyl Complexes of Zirconium as Catalysts for Homogeneous Olefin Polymerization"; Journal of Organometallic Chemistry, vol. 501, No. 1, Oct. 4, 1995 (6 pgs).
International Preliminary Report on Patentability for related PCT Application PCT/US2020/030040, mailed Nov. 11, 2021 (7 pgs).

* cited by examiner

*Primary Examiner* — Richard A. Huhn

(57) ABSTRACT

Embodiments of the present disclosure are directed towards method of making a metal-ligand complex, the method including: reacting a $(L^1)H$ compound and a base in a primary solvent to make a reaction mixture comprising an intermediate anionic $L^1$ compound in the primary solvent; and reacting the intermediate anionic $L^1$ compound and a $L^2MX_3$ complex to make a $L^1L^2MX_2$ complex, wherein $L^1$ and $L^2$ independently are cyclopentadienyl-type (Cp-type) ligands, M is zirconium or hafnium, and each X is a halide and wherein the intermediate anionic $L^1$ compound is not isolated from the reaction mixture.

18 Claims, No Drawings

METHOD OF MAKING METAL-LIGAND COMPLEXES

This application is a National Stage Application under 35 U.S.C. § 371 of International Application Number PCT/US2020/030040, filed Apr. 27, 2020 and published as WO 2020/223144 A1 on Nov. 5, 2020, which claims the benefit to U.S. Provisional Application 62/840,865, filed Apr. 30, 2019, the entire contents of which are incorporated herein by reference in its entirety

FIELD OF DISCLOSURE

Embodiments of the present disclosure are directed towards methods of making metal-ligand complexes, more specifically, making metal-ligand complexes without isolating intermediate compounds.

BACKGROUND

Metallocenes can be used in various applications, including as polymerization catalysts, as antiknock additives in gasoline, and as lubricants, as well as potential use in medical applications such as cancer, malaria and bacterial infection treatments. Applications of metallocenes may depend in part on facile methods for making them, e.g., to reduce undesired impurities, at reasonable cost and scale.

SUMMARY

The present disclosure provides various embodiments, including:

A method of making a metal-ligand complex, the method including: reacting a $(L^1)H$ compound and a base in a primary solvent to make a reaction mixture comprising an intermediate anionic $L^1$ compound in the primary solvent; and reacting the intermediate anionic $L^1$ compound and a $L^2MX_3$ complex to make a $L^1L^2MX_2$ complex, wherein $L^1$ and $L^2$ independently are cyclopentadienyl-type (Cp-type) ligands, M is zirconium or hafnium, and each X is a halide and wherein the intermediate anionic $L^1$ compound is not isolated from the reaction mixture.

The method comprising reacting the $L^1L^2MX_2$ complex with an alkylating agent to make a $L^1L^2MR_2$ complex, wherein the $L^1L^2MX_2$ complex is not isolated, wherein each R is a hydrocarbyl substituent.

DETAILED DESCRIPTION $L^1L^2MX_2$ complexes, which may be referred to as metal-ligand complexes having halide substituents, can be made by reacting a $(L^1)H$ compound, which may be referred to as an unsaturated cyclic hydrocarbon, and a base in a primary solvent to make a reaction mixture comprising an intermediate anionic $L^1$ compound in the primary solvent, and reacting the intermediate anionic $L^1$ compound and a $L^2MX_3$ complex. Surprisingly, it has been found that the $L^1L^2MX_2$ complex can be made without isolating the intermediate anionic $L^1$ compound from the reaction mixture. In other words, the $L^1L^2MX_2$ complex can be made without isolating the intermediate anionic $L^1$ compound prior to reacting the intermediate anionic $L^1$ compound and the $L^2MX_3$ complex.

In contrast to the present application, prior methods of making metal-ligand complexes having halide substituents have isolated one or more intermediate compounds. While not wishing to be bound to theory, it is believed that prior methods of making metal-ligand complexes having halide substituents have isolated one or more intermediate compounds to separate the intermediate compounds from byproducts, to change to different solvents for different reaction steps, to separate the intermediate compounds from side-products, and/or reduce the likelihood of unfeasibly low product yields, e.g. from competing reactions. Byproducts are made as a result of a desired reaction. Side-products are made from side reactions.

As used herein, all reference to the Periodic Table of the Elements and groups thereof is to the NEW NOTATION published in HAWLEY'S CONDENSED CHEMICAL DICTIONARY, Thirteenth Edition, John Wiley & Sons, Inc., (1997) (reproduced there with permission from IUPAC), unless reference is made to the Previous IUPAC form noted with Roman numerals (also appearing in the same), or unless otherwise noted.

Embodiments provide that the $L^1L^2MX_2$ complexes can be made utilizing a Cp-type ligand, e.g. the $(L^1)$ ligand. The Cp-type ligands, e.g., cyclopentadienyl ("Cp") and ligands isolobal to cyclopentadienyl, are one or more rings or ring systems, at least a portion of which includes π-bonded systems, such as indenyl, fluorenyl, 5H-cyclopenta[b]pyridinyl, 6aH-cyclopenta[b]thiophene, and other and heterocyclic analogues. The rings or ring systems can include atoms selected from the group consisting of Groups 13 to 16 atoms, and, in a particular embodiments, the atoms that make up the Cp-type ligands are selected from the group consisting of carbon, nitrogen, oxygen, silicon, sulfur, phosphorous, germanium, boron, aluminum, and combinations thereof, where carbon atoms make up at least 50% of the ring members. The Cp-type ligands can be selected from the group consisting of substituted and unsubstituted cyclopentadienyl ligands and ligands isolobal to cyclopentadienyl, non-limiting examples of which include indenyl, benzindenyl, fluorenyl, and phenanthrindenyl. Further non-limiting examples of such ligands include cyclopentadienyl, cyclopentaphenanthreneyl, indenyl, benzindenyl, fluorenyl, octahydrofluorenyl, cyclooctatetraenyl, cyclopentacyclododecenyl, phenanthrindenyl, 3,4-benzofluorenyl, 9-phenylfluorenyl, 8-H-cyclopent[a]acenaphthylenyl, 7-H-dibenzofluorenyl, indeno[1,2-9]anthrenyl, thiophenoindenyl, thiophenofluorenyl, hydrogenated versions thereof. The Cp-type ligands can be optionally-substituted cyclopentadienyls and optionally-substituted indenyls. The Cp-type ligands can be cyclopentadienyl, alkylcyclopentadienyls, dialkylcyclopentadienyls, trialkylcyclopentadienyls, tetralkylcyclopentadienyls, pentaalkylcyclopentadienyls, indenyl, alkylindenyls, dialkylindenyls, trialkylindenyls, tetralkylindenyls, pentaalkylindenyls, hexaalkylindenyls, heptaalkylindenyls and octaalkylindenyls. The Cp-type ligands can be cyclopentadienyl, methylcyclopentadienyl, ethylcyclopentadienyl, n-propylcyclopentadienyl, i-propylcyclopentadienyls, n-butylcyclopentadienyl, i-butylcyclopentadienyl, sec-butylcyclopentadienyl, dimethylcyclopentadienyls, trimethylcyclopentadienyls, tetramethylcyclopentadienyl, (methyl)(butyl)cyclopentadienyls, indenyl, alkylindenyls, dialkylindenyls and trialkylindenyls. The Cp-type ligands can be tetramethylcyclopentadienyl and dialkylindenyls. The Cp-type ligands can be cyclopentadienyl and alkylcyclopentadienyls. The Cp-type ligands can be 1,4-dimethylindenyl, 1,5-dimethylindenyl, 1,6-dimethylindenyl and 1,7-dimethylindenyl. The Cp-type ligands can be cyclopentadienyl, methylcyclopentadienyl and n-propylcyclopentadienyl.

The unsaturated cyclic hydrocarbon, e.g., $(L^1)H$, may be the conjugate acid of any Cp-type ligand. For example, for an indenyl the unsaturated cyclic hydrocarbon may be an indene, and for a cyclopentadienyl the unsaturated cyclic hydrocarbon may be a cyclopentadiene.

As used herein, a "hydrocarbyl" includes aliphatic, cyclic, olefinic, acetylenic and aromatic radicals (i.e., hydrocarbon radicals) comprising hydrogen and carbon that are deficient by one hydrogen. A "hydrocarbylene" is deficient by two hydrogens.

As used herein, an "alkyl" includes linear, branched and cyclic paraffin radicals that are deficient by one hydrogen. Thus, for example, $CH_3$ ("methyl") and $CH_2CH_3$ ("ethyl") are examples of alkyls.

As used herein, an "alkenyl" includes linear, branched and cyclic olefin radicals that are deficient by one hydrogen; alkynyl radicals include linear, branched and cyclic acetylene radicals deficient by one hydrogen radical.

As used herein, "aryl" groups include phenyl, naphthyl, pyridyl and other radicals whose molecules have the ring structure characteristic of benzene, naphthylene, phenanthrene, anthracene, etc. It is understood that an "aryl" group can be a $C_6$ to $C_{20}$ aryl group. For example, a $C_6H_5$ aromatic structure is an "phenyl", a $C_6H_4$ 2 aromatic structure is an "phenylene". An "arylalkyl" group is an alkyl group having an aryl group pendant therefrom. It is understood that an "aralkyl" group can be a $O_7$ to $C_{20}$ aralkyl group. An "alkylaryl" is an aryl group having one or more alkyl groups pendant therefrom.

As used herein, an "alkylene" includes linear, branched and cyclic hydrocarbon radicals deficient by two hydrogens. Thus, $CH_2$ ("methylene") and $CH_2CH_2$ ("ethylene") are examples of alkylene groups, Other groups deficient by two hydrogen radicals include "arylene" and "alkenylene".

As used herein, the term "heteroatom" includes any atom selected from the group consisting of B, Al, Si, Ge, N, P, O, and S. A "heteroatom-containing group" is a hydrocarbon radical that contains a heteroatom and may contain one or more of the same or different heteroatoms, and from 1 to 3 heteroatoms in a particular embodiment. Non-limiting examples of heteroatom-containing groups include radicals (monoradicals and diradicals) of imines, amines, oxides, phosphines, ethers, ketones, oxoazolines heterocyclics, oxazolines, and thioethers.

As used herein, an "alkylcarboxylate", "arylcarboxylate", and "alkylarylcarboxylate" is an alkyl, aryl, and alkylaryl, respectively, that possesses a carboxyl group in any position. Examples of arylcarboxylate include $C_6H_5CH_2C(O)O^-$, and examples of alkylcarboxylate include $CH_3C(O)O^-$.

As used herein, an "aralkyl" group is defined to be an aryl-substituted alkyl group having a free valence at a saturated carbon atom.

As used herein, the term "substituted" means that one or more hydrogen atoms in a parent structure has been independently replaced by a substituent atom or group. Each substituent atom independently is selected from halogen (esp., Cl, F, Br) and each substituent group independently is selected from hydroxyl groups, carbonyl groups, carboxyl groups, amine groups, phosphine groups, alkoxy groups, phenyl groups, naphthyl groups, $C_1$ to $C_{20}$ alkyl groups, $C_2$ to $C_{20}$ alkenyl groups, and combinations thereof. Examples of substituted alkyls and aryls includes, but are not limited to, primary acyl radicals, alkylamino radicals, alkoxy radicals, aryloxy radicals, alkylthio radicals, dialkylamino radicals, alkoxycarbonyl radicals, aryloxycarbonyl radicals, carbomoyl radicals, alkyl- and dialkyl-carbamoyl radicals, acyloxy radicals, acylamino radicals, arylamino radicals, and combinations thereof.

The $(L^1)H$ compound, may be obtained commercially. The $(L^1)H$ compound, may be synthesized by a known process, e.g. by utilizing known components and known conditions.

Embodiments provide that the $(L^1)H$ compound is reacted with a base in a primary solvent to make a reaction mixture comprising an intermediate anionic $L^1$ compound in the primary solvent. Embodiments provide that the base is strong enough to produce the $(L^1)$ ligand at reaction conditions. Bases include Arrhenius bases, Lewis bases, and combinations thereof. Examples of bases include Group 1 and Group 2 salts of carbanions, such as hydrides and amides. Examples of bases include butyllithium (e.g., n-butyllithium, t-butyllithium, sec-butyllithium), sodium hydride, potassium hydride, lithium hydride, sodium amide, potassium amide, lithium amide, sodium diethylamide, potassium diethylamide, lithium diethylamide, sodium diisopropylamide, potassium diisopropylamide, lithium diisopropylamide, sodium hexamethyldisilazide, potassium hexamethyldisilazide, lithium hexamethyldisilazide, and (ethyl)(butyl)magnesium.

Embodiments provide that the $(L^1)H$ compound is reacted with the base at a molar ratio from 10:1 to 1:10 moles of $(L^1)H$ compound to moles of base. All individual values and subranges from 10:1 to 1:10 moles of $(L^1)H$ compound to moles of base are included; for example, the $(L^1)H$ compound can reacted with a base at a molar ratio from 10:1, 8:1, 4:1, or 2:1 moles of $(L^1)H$ compound to moles of base to a molar ratio from 1:2, 1:4, 1:8, or 1:10 moles of $(L^1)H$ compound to moles of base. One or more embodiments provide that the $(L^1)H$ compound is reacted with a base at a molar ratio from 2:1 to 1:2, or at a molar ratio from 1.2:1 to 1:1.2.

The $(L^1)H$ compound is reacted with a base to make an intermediate compound. In other words, the intermediate compound is a reaction product of the $(L^1)H$ compound and the base, e.g. an intermediate anionic $L^1$ compound. Advantageously, after synthesis this intermediate anionic $L^1$ compound is not isolated, i.e. the intermediate anionic $L^1$ compound is not isolated prior to a subsequent chemical reaction for the synthesis of the metal-ligand complex. Herein, a synthesis that utilizes the intermediate anionic $L^1$ compound without isolating the intermediate anionic $L^1$ compound prior to a subsequent chemical reaction for the synthesis of the metal-ligand complex may be referred to as a one-pot synthesis. As used herein, "isolate" refers to a physical and/or a chemical procedure utilized to separate the intermediate anionic $L^1$ compound from other reagents used and/or generated in the reaction that makes the intermediate anionic $L^1$ compound. Examples of isolation procedures include distillation, extraction, filtration, and decantation. As such, "not isolated" indicates that the intermediate anionic $L^1$ compound remains with other reagents used and/or generated in the reaction that makes the intermediate anionic $L^1$ compound prior to a subsequent chemical reaction for the synthesis of the metal-ligand complex. In other words, the purity of the intermediate anionic $L^1$ compound is not increased prior to a subsequent chemical reaction for the synthesis of the metal-ligand complex.

The $(L^1)H$ compound is reacted with the base in a primary solvent to make a reaction mixture comprising the intermediate anionic $L^1$ compound in the primary solvent. As used herein, "primary solvent" refers to a solvent that is utilized for each reaction of the synthesis of the metal-ligand complex. One or more embodiments provide that a portion of the primary solvent may be supplied as an adduct with the $L^2MX_3$ complex. The primary solvent can be selected from ethers, including cyclic ethers, polyethers, thioethers, and hydrocarbons, including aromatic hydrocarbons. Examples of primary solvents include dimethoxyethane, toluene, ether, tetrahydrofuran, and combinations thereof. The primary solvent can be aprotic, e.g. an aprotic liquid. The primary solvent can have a boiling point from 20° C. to 200° C.; or a boiling point from 30° C. to 120° C.

For the reaction of the $(L^1)H$ compound with the base, the primary solvent may be from 20 to 95 weight percent based upon a total weight of the $(L^1)H$ compound, the base, and the primary solvent. All individual values and subranges from 20 to 95 weight percent are included; for example, the primary solvent may be from a lower limit of 20, 25, or 30 weight percent to an upper limit of 95, 75, or 60 weight percent based upon a total weight of the $(L^1)H$ compound, the base, and the primary solvent.

While, for the reaction of the $(L^1)H$ compound with the base, the primary solvent may be from 20 to 95 weight percent based upon a total weight of the $(L^1)H$ compound, the base, and the primary solvent, additional primary solvent may be added at one or more subsequent reaction stages. Also, while for the reaction of the $(L^1)H$ compound with the base, the primary solvent may be from 20 to 95 weight percent based upon a total weight of the $(L^1)H$ compound, the base, and the primary solvent, other solvents known in the art may be utilized at any reaction stage discussed herein. Various amounts of the other known solvents may be utilized for different applications.

Embodiments provide that after the intermediate anionic $L^1$ compound is made by reacting the $(L^1)H$ compound and the base, the intermediate anionic $L^1$ compound and a $L^2MX_3$ complex are reacted to make a $L^1L^2MX_2$ complex, where each X is a halide. The intermediate anionic $L^1$ compound is reacted with the $L^2MX_3$ complex in the presence of the primary solvent, e.g. in the reaction mixture. As mentioned, advantageously the intermediate anionic $L^1$ is not isolated from the reaction mixture. For instance, the intermediate anionic $L^1$ is not isolated from the reaction mixture prior to reacting the intermediate anionic $L^1$ compound and a $L^2MX_3$ complex to make a $L^1L^2MX_2$ complex, where each X is a halide.

As used herein, "$L^2MX_3$ complex" refers to a complex where $L^2$ is a Cp-type ligand as discussed herein, M is zirconium or hafnium, and each X is a halide. Embodiments provide that the Cp-type ligand can be the same or different from the Cp-type ligand $L^1$. Embodiments provide that $L^1$ and $L^2$ may be selected independently from one another. One or more embodiments provide that $L^1$ and $L^2$ are different. $L^2MX_3$ complexes are known in the art, and may be obtained commercially. The $L^2MX_3$ complex may be synthesized by a known process, e.g. by utilizing known components and known conditions.

Embodiments provide that the intermediate anionic $L^1$ compound is reacted with the $L^2MX_3$ complex at a molar ratio from 10:1 to 1:10 moles of intermediate anionic $L^1$ compound to moles of $L^2MX_3$ complex. All individual values and subranges from 10:1 to 1:10 moles of intermediate anionic $L^1$ compound to moles of $L^2MX_3$ complex are included; for example, the intermediate anionic $L^1$ compound can reacted with a $L^2MX_3$ complex at a molar ratio from 10:1, 8:1, 4:1, or 2:1 moles of intermediate anionic $L^1$ compound to moles of $L^2MX_3$ complex to a molar ratio from 1:2, 1:4, 1:8, or 1:10 moles of intermediate anionic $L^1$ compound to moles of $L^2MX_3$ complex. One or more embodiments provide that the intermediate anionic $L^1$ compound is reacted with the $L^2MX_3$ complex at a molar ratio from 1.5:1 to 1:1.5, or at a molar ratio from 1.2:1 to 1:1.2.

Moles of intermediate anionic $L^1$ compound may be calculated by the quantities of reactants, i.e. the $(L^1)H$ compound and the base, utilized to synthesize the intermediate anionic $L^1$ compound.

For the reaction of the intermediate anionic $L^1$ compound with the $L^2MX_3$ complex, the primary solvent may be from 20 to 95 weight percent based upon a total weight of the intermediate anionic $L^1$ compound, the $L^2MX_3$ complex, and the primary solvent. All individual values and subranges from 20 to 95 weight percent are included; for example, the primary solvent may be from a lower limit of 20, 25, or 30 weight percent to an upper limit of 95, 75, or 60 weight percent based upon a total weight of the intermediate anionic $L^1$ compound, the $L^2MX_3$ complex, and the primary solvent.

Embodiments provide that the $L^1L^2MX_2$ complex, where $L^1$ and $L^2$ independently are Cp-type ligands as previously discussed, M is zirconium or hafnium, and where each X is a halide can be reacted with an alkylating agent to make a $L^1L^2MR_2$ complex, where each R is a hydrocarbyl substituent. Further surprisingly, it has been found that the $L^1L^2MR_2$ can be made without isolating the $L^1L^2MX_2$ complex from the reaction mixture. In other words, embodiments provide that the $L^1L^2MX_2$ complex is not isolated prior to reacting the $L^1L^2MX_2$ complex and the alkylating agent. "Made without isolating", i.e. not isolating, indicates that the $L^1L^2MX_2$ complex remains with other reagents used and/or generated in the reaction that makes the $L^1L^2MX_2$ complex prior to a subsequent chemical reaction for the synthesis of the metal-ligand complex. In other words, the purity of the $L^1L^2MX_2$ complex is not increased prior to a subsequent chemical reaction for the synthesis of the $L^1L^2MR_2$ complex.

In contrast to the present application, prior methods of making metal-ligand complexes having alkyl substituents have isolated the metal-ligand complex having halide substituents prior to reacting the metal-ligand complex having halide substituents and the alkylating agent. While not wishing to be bound to theory, it is believed that prior methods utilized this isolation due to the generation of byproducts, the generation of side-products, a desire to employ different solvents for different reaction steps, and/or unfeasibly low product yields.

Alkylating agents are known in the art and may be obtained commercially. The alkylating agent may be synthesized by a known process, e.g. by utilizing known components and known conditions. One or more embodiments provide that the alkylating agent is a Grignard reagent, e.g., an alkyl Grignard reagent, which may be referred to as an alkylmagnesium halide. Examples of alkylating agents include, methylmagnesium bromide, methylmagnesium chloride, methyllithium, phenylmagnesium bromide, benzylmagnesium bromide, trimethylsilylmethyllithium, trimethylsilylmethylmagnesium bromide, and combinations thereof.

Embodiments provide that the $L^1L^2MX_2$ complex is reacted with the alkylating agent at a molar ratio from 10:1 to 1:10 moles of $L^1L^2MX_2$ to moles of alkylating agent. All individual values and subranges from 10:1 to 1:10 moles of $L^1L^2MX_2$ complex to moles of alkylating agent are included; for example, the $L^1L^2MX_2$ complex can reacted with an alkylating agent at a molar ratio from 10:1, 8:1, 4:1, or 2:1 moles of $L^1L^2MX_2$ complex to moles of alkylating agent to a molar ratio from 1:2, 1:4, 1:8, or 1:10 moles of $L^1L^2MX_2$ complex to moles of alkylating agent. Moles of $L^1L^2MX_2$ complex may be calculated by the quantities of reactants utilized to synthesize the metal-ligand complex having halide substituents.

For the reaction of the $L^1L^2MX_2$ complex with the alkylating agent, the primary solvent may be from 20 to 95 weight percent based upon a total weight of the $L^1L^2MX_2$ complex, the alkylating agent, and the primary solvent. All individual values and subranges from 20 to 95 weight percent are included; for example, the primary solvent may be from a lower limit of 20, 25, or 30 weight percent to an upper limit of 95, 75, or 60 weight percent based upon a total weight of the $L^1L^2MX_2$ complex, the alkylating agent, and the primary solvent.

The $L^1L^2MR_2$ complex, which is made by the reaction of the $L^1L^2MX_2$ complex with the alkylating agent, can be represented by the following formula: $(L^1)(L^2)MR_2$, where $L^1$ and $L^2$ are as previously discussed, M is zirconium or hafnium, and where each R is a hydrocarbyl substituent. One or more embodiments provided that each R is independently a $C_1$ to $C_{20}$ alkyl.

Further surprisingly, it has been found that each of the chemical reactions discussed herein may occur in a same reaction vessel. For instance, reacting the $(L^1)H$ compound and the base in the primary solvent to make an intermediate anionic $L^1$ compound may occur in a particular reaction vessel. Subsequently, reacting the intermediate anionic $L^1$ compound and a $L^2MX_3$ complex to make a $L^1L^2MX_2$ complex may occur in the particular reaction vessel. Subsequently, reacting the $L^1L^2MX_2$ complex with an alkylating agent to make a $L^1L^2MR_2$ complex may occur in the particular reaction vessel.

Utilizing a same reaction vessel may advantageously circumvent a number of purification procedures, help to minimize chemical waste, and/or help to reduce synthesis time of a target molecule, e.g. the metal-ligand complexes discussed herein. While not wishing to be bound to theory, it is believed that prior methods utilized multiple reaction vessels due to the generation of byproducts, the generation of side-products, a desire to employ different solvents for different reaction steps, and/or unfeasibly low product yields.

The metal-ligand complexes discussed herein, i.e. the $L^1L^2MX_2$ complex and the $L^1L^2MR_2$ complex, may be utilized for a number of applications. For instance, the metal-ligand complexes may be utilized to make polymerization catalysts, which may be referred to as metallocene catalysts. Metallocene catalysts are known in the art. For instance, the metal-ligand complex may be contacted, under activating conditions, with an activator so as to activate the metal-ligand complex, thereby making the polymerization catalyst. Activating conditions are well known in the art.

The polymerization catalyst, which is made from the metal-ligand complexes can be utilized to make a polymer. For instance, the polymerization catalyst and an olefin can be contacted under polymerization conditions to form a polymer, e.g., a polyolefin polymer. The polymerization process may be a suspension polymerization process, a slurry polymerization process, and/or a gas phase polymerization process. The polymerization process may utilize using known equipment and reaction conditions, e.g., known polymerization conditions. The polymerization process is not limited to any specific type of polymerization system. The polymer can be utilized for a number of articles such as films, fibers, nonwoven and/or woven fabrics, extruded articles, and/or molded articles.

The polymerization catalyst, which is made from the metal-ligand complexes may be utilized with a support. A "support", which may also be referred to as a carrier, refers to any support material, including a porous support material, such as talc, inorganic oxides, and inorganic chlorides.

A number of aspects of the present disclosure are provided as follows.

Aspect 1 provides a method of making a metal-ligand complex, the method comprising:

reacting a $(L^1)H$ compound and a base in a primary solvent to make a reaction mixture comprising an intermediate anionic $L^1$ compound in the primary solvent; and reacting the intermediate anionic $L^1$ compound and a $L^2MX_3$ complex to make a $L^1L^2MX_2$ complex, wherein $L^1$ and $L^2$ independently are cyclopentadienyl-type (Cp-type) ligands, M is zirconium or hafnium, and each X is a halide and wherein the intermediate anionic $L^1$ compound is not isolated from the reaction mixture.

Aspect 2 provides the method of aspect 1, comprising reacting the $L^1L^2MX_2$ complex with an alkylating agent to make a $L^1L^2MR_2$ complex, wherein the $L^1L^2MX_2$ complex is not isolated from the reaction mixture, wherein each R is a hydrocarbyl substituent.

Aspect 3 provides the method of any one of aspects 1-2, wherein the primary solvent is selected from ethers, polyethers, thioethers, and hydrocarbons.

Aspect 4 provides the method of any one of aspects 1-3, wherein the primary solvent is selected from dimethoxyethane, toluene, ether, tetrahydrofuran, and combinations of any two or more thereof.

Aspect 5 provides the method of any one of aspects 1-4, wherein each X is Cl.

Aspect 6 provides the method of any one of aspects 1-5, wherein the alkylating agent is an alkylmagnesium halide.

Aspect 7 provides the method of any one of aspects 1-6, wherein the base is selected from butyllithium, 1-methylpropyllithium, 2-methylpropyllithium, and 1,1-dimethylethyllithium.

Aspect 8 provides the method of any one of aspects 1-7, wherein each of $L^1$ and $L^2$ is independently a substituted cyclopentadienyl or a substituted indenyl.

Aspect 9 provides the method of any one of aspects 1-8, wherein $L^1$ and $L^2$ are different.

Aspect 10 provides the method of any one of aspects 2-9, wherein each R is independently a $C_1$ to $C_{20}$ alkyl or benzyl.

Aspect 11 provides the method of any one of aspects 2-10, wherein the reacting the $(L^1)H$ compound and the base to make the intermediate anionic $L^1$ compound and the reacting the intermediate anionic $L^1$ compound and the $L^2MX_3$ complex to make the $L^1L^2MX_2$ complex occurs in a same reaction vessel without removing the intermediate anionic $L^1$ compound from the reaction vessel.

Aspect 12 provides the method of aspect 11, wherein the reacting the $(L^1)H$ compound and the base to make the intermediate anionic $L^1$ compound and the reacting the intermediate anionic $L^1$ compound and the $L^2MX_3$ complex to make the $L^1L^2MX_2$ complex, and the reacting the $L^1L^2MX_2$ complex and the alkylating agent to make the $L^1L^2MR_2$ complex occurs in the same reaction vessel without removing the intermediate anionic $L^1$ compound and the $L^1L^2MX_2$ complex from the reaction vessel.

Aspect 13 provides the method of any one of aspects 2-12, wherein the reacting the $(L^1)H$ compound and the base, the reacting the intermediate anionic $L^1$ compound and the $L^2MX_3$ complex, and the reacting the $L^1L^2MX_2$ complex with the alkylating agent occurs in the primary solvent.

EXAMPLES 3,6-Dimethyl-1H-indene, which may be represented by the following formula:

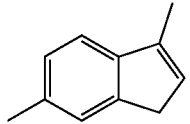

was synthesized as follows. 3,6-Dimethyl-1H-indene, when deprotonated can form an anion that may be referred to as 1,5-dimethyl-indenyl. In a glove box, a 250-mL two-neck container fitted with a thermometer (side neck) and a solids addition funnel, was charged with tetrahydrofuran (25 mL) and methylmagnesium bromide (2 equivalents, 18.24 mL, 54.72 mmol). The contents of the container were cooled in a freezer set at −35° C. for 40 minutes; when removed from the freezer, the contents of the container were measured to be −12° C. While stirring, indanone [5-Methyl-2,3-dihydro-1H-inden-1-one (catalog #HC-2282)] (1 equivalent, 4.000 g, 27.36 mmol) was added to the container as a solid in small portions and the temperature increased due to exothermic reaction; additions were controlled to keep the temperature at or below room temperature. Once the addition was complete, the funnel was removed, and the container was sealed (SU BA). The sealed container was moved to a fume hood (with the contents already at room temperature) and put under a nitrogen purge, then stirred for 3 hours. The nitrogen purge was removed, diethyl ether (25 mL) was added to the container to replace evaporated solvent, and then the reaction was cooled using an acetone/ice bath. A HCl (15% volume) solution (9 equivalents, 50.67 mL, 246.3 mmol) was added to the contents of the container very slowly using an addition funnel, the temperature was maintained below 10° C. Then, the contents of the container were warmed up slowly for approximately 12 hours (with the bath in place). Then, the contents of the container were transferred to a separatory funnel and the phases were isolated. The aqueous phase was washed with diethyl ether (3×25 mL). The combined organic phases were then washed with sodium bicarbonate (50 mL, saturated aqueous solution), water (50 mL), and brine (50 mL). The organic phase was dried over magnesium sulfate, filtered and the solvent removed by rotary evaporation. The resulting dark oil, confirmed as product by NMR, was dissolved in pentane (25 mL), then filtered through a short silica plug (pre-wetted with pentane) that was capped with sodium sulfate. Additional pentane (25-35 mL) was used to flush the plug, then were combined with the first. The solution was dried by rotary evaporation resulting in 2.87 g (74% yield) of 3,6-dimethyl-1H-indene that was confirmed as product by NMR. $^1$H NMR ($C_6D_6$): δ 7.18 (d, 1H), 7.09 (s, 1H), 7.08 (d, 1H), 5.93 (mult, 1H), 3.07 (mult, 2H), 2.27 (s, 3H), 2.01 (q, 3H).

Example 1, a synthesis of a metal ligand complex, was performed as follows. In a glovebox, $(L^1)$H compound (3,6-dimethyl-1H-indene; 1.000 grams) and primary solvent (ether; 10 mL) were added to a container (118 mL) and the contents of the container were cooled to −35° C. A base (n-butyllithium; 1.6M hexanes; 4.3 mL; 0.0069 mole) was added to the contents of the container; the contents of container were stirred for approximately 3 hours; while stirring additional primary solvent (ether; 10 mL) was added to the contents of the container, which were again cooled to −35° C. following an observed exotherm. Then, NMR was utilized and confirmed that the $(L^1)$H compound and the base had reacted to form an intermediate anionic $L^1$ compound. Thereafter, a $L^2MX_3$ complex ($CpZrCl_3$; 1.821 grams) was added in portions to the contents of the container while stirring. After approximately 3 hours a $L^1L^2MX_2$ complex, i.e. cyclopentadienyl(1,5-dimethylindenyl) zirconium dichloride was confirmed as product by NMR. $^1$H NMR ($d_8$-THF): δ 7.48 (d, 1H), 7.42 (m, 1H), 7.07 (dd, 1H), 6.54 (d, 1H), 6.43 (dd, 1H), 6.19 (s, 5H), 2.44 (s, 3H), 2.42 (s, 3H).

After the NMR confirmation of cyclopentadienyl(1,5-dimethylindenyl) zirconium dichloride, the contents of the container were stirred for approximately 12 hours. Then an alkylating agent (methylmagnesium bromide; 3.0M in ether; 4.6 mL) was added to the contents of the container, which were stirred for approximately 24 hours and then warmed to room temperature; thereafter a $L^1L^2MR_2$ complex, i.e. cyclopentadienyl(1,5-dimethylindenyl) zirconium dimethyl, was confirmed as product by NMR. $^1$H NMR ($d_8$-THF): δ 7.35 (d, 1H), 7.07 (m, 1H), 6.91 (dd, 1H), 6.01 (d, 1H), 5.94 (dd, 1H), 5.86 (s, 5H), 2.29 (s, 3H), 2.28 (s, 3H), −0.74 (s, 3H), −1.12 (s, 3H).

Example 2, a synthesis of a metal ligand complex, was performed as follows. In a glovebox, $(L^1)$H compound (1,5-Me$_2$-Indene; 1.000 grams) and primary solvent (dimethoxyethane; 10 mL) were added to a container (118 mL) and the contents of the container were cooled to −35° C. A base (n-butyllithium; 1.6M hexanes; 4.3 mL; 0.0069 mole) was added to the contents of the container; the contents of container were stirred for approximately 3 hours and were again cooled to −35° C. following an observed exotherm. Then, NMR was utilized and confirmed that the $(L^1)$H compound and the base had reacted to form an intermediate anionic $L^1$ compound. Thereafter, a $L^2MX_3$ complex ($CpZrCl_3$; 1.821 grams) was added in portions to the contents of the container while stirring. After approximately 3 hours a $L^1L^2MX_2$ complex, i.e cyclopentadienyl(1,5-dimethylindenyl) zirconium dichloride, was confirmed as product by NMR. $^1$H NMR ($d_8$-THF): δ 7.48 (d, 1H), 7.42 (m, 1H), 7.07 (dd, 1H), 6.54 (d, 1H), 6.43 (dd, 1H), 6.19 (s, 5H), 2.44 (s, 3H), 2.42 (s, 3H).

After the NMR confirmation of cyclopentadienyl(1,5-dimethylindenyl) zirconium dichloride, the contents of the container were stirred for approximately 12 hours. Then an alkylating agent (methylmagnesium bromide; 3.0M in ether; 4.6 mL) was added to the contents of the container, which were stirred for approximately 24 hours and then warmed to room temperature; thereafter the $L^1L^2MR_2$ complex, i.e. cyclopentadienyl(1,5-dimethylindenyl) zirconium dimethyl, was confirmed as product by NMR. $^1$H NMR ($d_8$-THF): δ 7.35 (d, 1H), 7.07 (m, 1H), 6.91 (dd, 1H), 6.01 (d, 1H), 5.94 (dd, 1H), 5.86 (s, 5H), 2.29 (s, 3H), 2.28 (s, 3H), −0.74 (s, 3H), −1.12 (s, 3H).

Example 3, a synthesis of a metal ligand complex, was performed as follows. In a glovebox, $(L^1)$H compound (1,5-Me$_2$-Indene; 1.000 grams) and primary solvent (toluene; 10 mL) were added to a container (118 mL) and the contents of the container were cooled to −35° C. A base (n-butyllithium; 1.6M hexanes; 4.3 mL; 0.0069 mole) was added to the contents of the container; the contents of container were stirred for approximately 3 hours and were again cooled to −35° C. following an observed exotherm. Then, NMR was utilized and confirmed that the $(L^1)$H compound and the base had reacted to form an intermediate anionic $L^1$ compound. Thereafter, a $L^2MX_3$ complex (CpZrCl$_3$; 1.821 grams) was added in portions to the contents of the container while stirring. After approximately 3 hours a L$^1$L$^2$MX$_2$ complex, i.e. cyclopentadienyl(1,5-dimethylindenyl) zirconium dichloride was confirmed as product by NMR. $^1$H NMR (d$_8$-THF): δ 7.48 (d, 1H), 7.42 (m, 1H), 7.07 (dd, 1H), 6.54 (d, 1H), 6.43 (dd, 1H), 6.19 (s, 5H), 2.44 (s, 3H), 2.42 (s, 3H).

After the NMR confirmation of cyclopentadienyl(1,5-dimethylindenyl) zirconium dichloride, the contents of the container were stirred for approximately 12 hours. Then an alkylating agent (methylmagnesium bromide; 3.0M in ether; 4.6 mL) was added to the contents of the container, which were stirred for approximately 24 hours and then warmed to room temperature; thereafter a L$^1$L$^2$MR$_2$ complex, i.e. cyclopentadienyl(1,5-dimethylindenyl) zirconium dimethyl, was confirmed as product by NMR. $^1$H NMR (d$_8$-THF): δ 7.35 (d, 1H), 7.07 (m, 1H), 6.91 (dd, 1H), 6.01 (d, 1H), 5.94 (dd, 1H), 5.86 (s, 5H), 2.29 (s, 3H), 2.28 (s, 3H), −0.74 (s, 3H), −1.12 (s, 3H).

Example 4, a synthesis of a metal ligand complex, was performed as follows. In a glovebox, (L$^1$)H compound (1,5-Me$_2$-Indene; 10.00 grams) and primary solvent (dimethoxyethane; 100 mL) were added to a container (500 mL). A base (n-butyllithium; 1.6M hexanes; 43.3 mL) was added to the contents of the container by an addition funnel over approximately 38 minutes while the contents of the container were maintained at approximately 30° C. Then, the contents of container were stirred for approximately 5 minutes at a temperature of approximately 37° C. Then, NMR was utilized and confirmed that the (L$^1$)H compound and the base had reacted to form an intermediate anionic L$^1$ compound. Approximately 40 minutes thereafter, a L$^2$MX$_3$ complex (CpZrCl$_3$; 18.21 grams) was added in portions over approximately 12 minutes to the contents of the container while stirring and maintaining the temperature at approximately 30° C. After approximately 5 minutes and again after approximately 30 minutes, a L$^1$L$^2$MX$_2$ complex, i.e. cyclopentadienyl(1,5-dimethylindenyl) zirconium dichloride, was confirmed as product by NMR. $^1$H NMR (d$_8$-THF): δ 7.48 (d, 1H), 7.42 (m, 1H), 7.07 (dd, 1H), 6.54 (d, 1H), 6.43 (dd, 1H), 6.19 (s, 5H), 2.44 (s, 3H), 2.42 (s, 3H). Approximately 50 minutes after the addition of the L$^2$MX$_3$ complex was completed, an alkylating agent (methylmagnesium bromide; 3.0M in ether; 46.2 mL) was added to the contents of the container via an addition funnel over approximately 2.5 hours while the contents of the container were maintained at approximately 28° C.; thereafter a L$^1$L$^2$MR$_2$ complex, i.e. cyclopentadienyl(1,5-dimethylindenyl) zirconium dimethyl, was confirmed as product by NMR. $^1$H NMR (d$_8$-THF): δ 7.35 (d, 1H), 7.07 (m, 1H), 6.91 (dd, 1H), 6.01 (d, 1H), 5.94 (dd, 1H), 5.86 (s, 5H), 2.29 (s, 3H), 2.28 (s, 3H), −0.74 (s, 3H), −1.12 (s, 3H).

Example 5, a synthesis of a metal ligand complex, was performed as follows. In a glovebox, (L$^1$)H compound (1,2,3,4-tetramethyl-1,3-cyclopentadiene; 1.00 g; 8.18 mmol) and primary solvent (dimethoxyethane; 20 mL) were added to a container (40 mL) and cooled to approximately −30° C. Then, a base (n-butyllithium; 3.47 mL; 8.18 mmol) was slowly to the contents of the container while maintaining the temperature below approximately 56° C. After approximately 15 minutes, the presence of an the intermediate anionic L$^1$ compound was confirmed by NMR. Then, a L$^2$MX$_3$ complex (CpZrCl$_3$; 2.15 grams, 8.18 mmol) was added to the contents of the container in portions over 5 minutes. Then, an alkylating agent (methylmagnesium bromide; 2.7M in ether; 6.06 mL; 16.4 mmoL) was added by syringe slowly to the contents of the container, while maintaining the temperature below 30° C.; the contents of the container were allowed to react for approximately 12 hours. Solvents were removed in vacuo and the product was extracted into n-hexane (ca 20 mL), then filtered through diatomaceous earth, washed with additional n-hexane (10 mL), and were dried in vacuo, to provide 1.34 g of a L$^1$L$^2$MR$_2$ complex, i.e. cyclopentadienyl(1,5-dimethylindenyl) zirconium dimethyl, which was confirmed as product by NMR. $^1$H NMR (d$_6$-benzene): δ 5.77 (s, 5H), 4.95 (s, 1H), 1.77 (s, 6H), 1.66 (s, 6H), −0.29 (s, 6H).

Example 6, a synthesis of a metal ligand complex, was performed as follows. In a glovebox, (L$^1$)H compound (1,2,3,4-tetramethyl-1,3-cyclopentadiene; 0.50 g; 4.09 mmol) and primary solvent (dimethoxyethane; 20 mL) were added to a container (40 mL) and cooled to approximately −30° C. Then, a base (n-butyllithium; 2.36M in hexanes; 1.56 mL; 3.68 mmol) was slowly to the contents of the container while maintaining the temperature below approximately 40° C. After about 15 minutes, the presence of an i intermediate anionic L$^1$ compound was confirmed by NMR. Then, a L$^2$MX$_3$ complex ((n-PrCp)ZrCl$_3$(DME); 1.45 grams; 3.68 mmol) was added to the contents of the container in portions over 5 minutes. Then, an alkylating agent (methylmagnesium bromide; 2.7M in ether; 2.73 mL; 7.36 mmol) was added by syringe slowly to the contents of the container, while maintaining the temperature below 30° C.; the contents of the container were allowed to react for approximately 12 hours. Solvents were removed in vacuo and the product was extracted into n-hexane (ca 20 mL), then filtered through diatomaceous earth, washed with additional n-hexane (10 mL), and were dried in vacuo, to provide 1.19 g of a L$^1$L$^2$MR$_2$ complex, i.e. (n-propylcyclopentadienyl)(tetramethylcyclopentadienyl) zirconium dimethyl, which was confirmed as product by NMR. $^1$H NMR (d$_6$-benzene): δ 5.72 (t, 2H), 5.46 (t, 2H), 4.98 (m, 1H), 2.41 (m, 2H), 1.81 (s, 6H), 1.70 (s, 6H), 1.57 (m, 2H), 0.91 (t, 3H), −0.31 (s, 6H).

Example 7, a synthesis of a metal ligand complex, was performed as follows. In a glovebox, (L$^1$)H compound (1,5-Me$_2$-Indene; 2.00 grams) and primary solvent (dimethoxyethane; 20 mL) were added to a container (100 mL). After cooling to −7° C., a base (n-butyllithium; 2.5 M hexanes; 5.6 mL) was added to the contents of the container via syringe over approximately 5 minutes while the contents of the container were maintained at approximately 23° C. Then, the contents of container were stirred for approximately 15 minutes at a temperature of approximately 23° C. NMR was utilized to confirm that the (L$^1$)H compound and the base had reacted to form an intermediate anionic L$^1$ compound. The solution was cooled again to −7° C., and a L$^2$MX$_3$ complex ((MeCp)HfCl$_3$(DME); 6.30 grams) was added in portions over approximately 12 minutes to the contents of the container while stirring and maintaining the temperature at or below approximately 12° C. After approximately 15 minutes, additional dimethoxyethane (20 mL) was added to resume efficient stirring. Next, an alkylating agent (methylmagnesium bromide; 3.0M in ether; 11.1 mL) was added to the contents of the container via syringe over approximately 30 minutes while the contents of the container were maintained at approximately 21-35° C.; after about three hours, a L$^1$L$^2$MR$_2$ complex, i.e. (methylcyclopentadienyl)(1,5-dimethylindenyl) hafnium dimethyl, was confirmed as product by NMR. Solvents were removed in vacuo and the product was extracted into n-hexane (ca 80 mL), then filtered through diatomaceous earth, washed with additional n-hexane (60 mL), and were dried in vacuo, to provide 3.30 g of a L$^1$L$^2$MR$_2$ complex, i.e. (methylcyclopentadienyl)(1,5-dimethylindenyl) hafnium dimethyl after recrystallization from pentane at reduced temperature, which was confirmed as product by NMR. $^1$H NMR (d$_6$-benzene): δ 7.27 (1H), 6.94 (1H), 6.84 (1H), 5.71 (1H), 5.61 (1H), 5.49 (1H), 5.44 (1H), 5.25 (2H), 2.22 (3H), 2.19 (3H), 1.92 (3H), −0.46 (3H), −0.80 (3H).

What is claimed is:

1. A method of making a metal-ligand complex, the method comprising:
    reacting a (L$^1$)H compound and a base in a primary solvent to make a reaction mixture comprising an intermediate anionic L$^1$ compound in the primary solvent; and
    reacting the intermediate anionic L$^1$ compound and a L$^2$MX$_3$ complex to make a L$^1$L$^2$MX$_2$ complex, wherein L$^1$ and L$^2$ independently are cyclopentadienyl-type (Cp-type) ligands, M is zirconium or hafnium, and each X is a halide and wherein the intermediate anionic L$^1$ compound is not isolated from the reaction mixture, wherein each of L$^1$ and L$^2$ is independently a substituted cyclopentadienyl or a substituted indenyl; and
    reacting the L$^1$L$^2$MX$_2$ complex with an alkylating agent to make a L$^1$L$^2$MR$_2$ complex, wherein the L$^1$L$^2$MX$_2$ complex is not isolated from the reaction mixture, wherein each R is a hydrocarbyl substituent.

2. The method of claim 1, wherein the primary solvent is selected from ethers, polyethers, thioethers, and hydrocarbons.

3. The method of claim 1, wherein the primary solvent is selected from dimethoxyethane, toluene, ether, tetrahydrofuran, and combinations of any two or more thereof.

4. The method of claim 1, wherein each X is Cl.

5. The method of claim 1, wherein the alkylating agent is an alkylmagnesium halide.

6. The method of claim 1, wherein the base is selected from butyllithium, 1-methylpropyllithium, 2-methylpropyllithium, and 1,1-dimethylethyllithium.

7. The method of claim 1, wherein L$^1$ and L$^2$ are different.

8. The method of claim 1, wherein each R is independently a C$_1$ to C$_{20}$ alkyl or benzyl.

9. The method of claim 1, wherein the reacting the (L$^1$)H compound and the base to make the intermediate anionic L$^1$ compound, and the reacting the intermediate anionic L$^1$ compound and the L$^2$MX$_3$ complex to make the L$^1$L$^2$MX$_2$ complex occurs in a same reaction vessel without removing the intermediate anionic L$^1$ compound from the reaction vessel.

10. The method of claim 9, wherein the reacting the (L$^1$)H compound and the base to make the intermediate anionic L$^1$ compound and the reacting the intermediate anionic L$^1$ compound and the L$^2$MX$_3$ complex to make the L$^1$L$^2$MX$_2$ complex, and the reacting the L$^1$L$^2$MX$_2$ complex and the alkylating agent to make the L$^1$L$^2$MR$_2$ complex occurs in the same reaction vessel without removing the intermediate anionic L$^1$ compound and the L$^1$L$^2$MX$_2$ complex from the reaction vessel.

11. The method of claim 10, wherein the reacting the (L$^1$)H compound and the base, the reacting the intermediate anionic L$^1$ compound and the L$^2$MX$_3$ complex, and the reacting the L$^1$L$^2$MX$_2$ complex with the alkylating agent occurs in the primary solvent.

12. The method of claim 1, the Cp-type ligand is selected from alkylcyclopentadienyl, dialkylcyclopentadienyl, trialkylcyclopentadienyl, tetralkylcyclopentadienyl, pentaalkylcyclopentadienyl, alkylindenyl, dialkylindenyl, trialkylindenyl, and tetralkylindenyl.

13. The method of claim 1, wherein L$^1$ is 1,4-dimethylindenyl, 1,5-dimethylindenyl, 1,6-dimethylindenyl, or 1,7-dimethylindenyl.

14. The method of claim 1, wherein each R is independently a C$_4$ to C$_{20}$ alkyl or benzyl.

15. The method of claim 1, wherein the primary solvent is toluene.

16. The method of claim 1, wherein the M is a hafnium.

17. A method of making a metal-ligand complex, the method comprising:
    reacting a (L$^1$)H compound and a base in a primary solvent to make a reaction mixture comprising an intermediate anionic L$^1$ compound in the primary solvent; and
    reacting the intermediate anionic L$^1$ compound and a L$^2$MX$_3$ complex to make a L$^1$L$^2$MX$_2$ complex, wherein L$^1$ and L$^2$ independently are cyclopentadienyl-type (Cp-type) ligands, M is zirconium or hafnium, and each X is a halide and wherein the intermediate anionic L$^1$ compound is not isolated from the reaction mixture, wherein the L$^1$L$^2$MX$_2$ complex is (methylcyclopentadienyl)(1,5-dimethylindenyl) hafnium dichloride.

18. The method of claim 17, the method further comprising reacting the L$^1$L$^2$MX$_2$ complex with an alkylating agent to make a L$^1$L$^2$MR$_2$ complex, wherein the L$^1$L$^2$MX$_2$ complex is not isolated from the reaction mixture, wherein the L$^1$L$^2$MR$_2$ complex is (methylcyclopentadienyl)(1,5-dimethylindenyl) hafnium dimethyl.

\* \* \* \* \*